Jan. 15, 1952     T. F. WHITE     2,582,366
POWER TRANSMISSION BELT

Filed Dec. 12, 1949

INVENTOR.
THOMAS F. WHITE
BY
*Anderson + Muller*
ATTORNEYS

Patented Jan. 15, 1952

2,582,366

UNITED STATES PATENT OFFICE 2,582,366

POWER TRANSMISSION BELT

Thomas F. White, Denver, Colo., assignor to The Gates Rubber Company, Denver, Colo., a corporation of Colorado Application December 12, 1949, Serial No. 132,577

4 Claims. (Cl. 74—233)

This invention relates to power transmission belts and more particularly to endless V-belts.

In the highly developed art of V-belt manufacture, many belts have been made which are quite satisfactory for a particular purpose or in a particular installation. Thus, where the belt is trained over relatively large pulleys or sheaves and the bending of the belt is small, as it passes over the pulleys, belts have been produced which operate satisfactorily and have a relatively long useful life. The same belts, however, if used with pulleys of a size below a certain critical diameter are not satisfactory and will wear unduly.

The diameter of pulleys is a very important factor in the design of belt transmission systems. If the pulley diameters can be made small, it effects a reduction in cost of the installation and also the size and weight thereof. Where the dynamic effects of heavy rotating masses is a criterion in the design, these effects are also reduced. The designer of a V-belt drive well knows that he cannot choose pulleys of a size below a certain limit and expect the drive to give satisfactory results, principally because belts heretofore available would not operate under such conditions and have an optimum useful life. The designer also knows that the power transmission capacity of a belt is a function of the difference in tension between the tight and loose sides thereof multiplied by the belt speed. The designer sometimes chooses large pulleys so that the belt speeds will be high, thus reducing the tension in the belt; other times the power is transmitted by using smaller pulleys and operating them at higher speeds. This is not always possible, however, since in many installations one of the pulleys, such as the drive pulley, must operate at a certain angular velocity. If this factor is fixed, then the diameter of the drive pulley cannot be chosen smaller than a certain minimum and give satisfactory results with a belt which is designed to operate with optimum life over pulleys no smaller than that certain minimum.

Much effort has been expended in attempting to provide belts which will have a longer useful life when used over small pulleys and operated under conditions of high tension therein. Improvements, of course, have been made in the art and possibly the ultimate desires for a belt having certain physical characteristics may never be achieved, but the designer is nevertheless eager to receive any improvements which will give him greater flexibility in choice of pulleys for his installation.

Some of the requirements for what might be called a "high performance" belt are that it be as small in cross section as possible, be capable of absorbing exceptionally high tensional stress, have a section which will be stable in size under stress, especially as it passes over the pulleys, and where the pulleys are small be sufficiently flexible so that it has high traction and long wearing characteristics. Some of these requirements have been recognized and belts devised which fulfill certain of the requirements, but no prior art construction is known which embodies all of the foregoing requirements. As an example of the prior art, the DeWein Patent No. 1,970,509, granted August 14, 1934, discloses the use of a flexible covering for a belt so that the belt will flex readily and also the use of cords disposed axially of the belt for absorbing the tensional stresses to which the belt is subjected in use.

It should be recognized that a V-belt consists of a number of component parts, each serving a particular purpose and when properly integrated they mutually contribute to provide a belt having longer life. Thus, a tension component is recognized as necessary and the belt must also have pulley engaging surfaces, which not only take the principal wear to which the belt is subjected, but also transmit forces between the pulley surfaces and the tension component. It has been previously recognized that this surface should be readily flexible to reduce internal work produced in the belt by reason of flexure thereof, and also to achieve proper conformity and traction characteristics with respect to the pulley surfaces. Prior to this invention, however, the importance of the stability of the relative positions of the side walls of the belt during operation is not believed to have been recognized. It has been discovered that by proper reinforcement within the body of the belt, the belt covering, and hence the entire belt, has a much longer useful life, and especially when operated over relatively small pulleys under high performance conditions of tension.

The principal objects of the invention, therefore, are to provide a V-belt which will be sufficiently flexible to satisfactorily operate over relatively small pulleys, be capable of absorbing high tensional stresses and have a long useful life for wear under these high performance conditions.

Another object is to provide a belt which has a tension component, a flexible covering, and suitable reinforcement for the covering to produce uniform wear thereon.

A further object is to provide a belt which has optimum flexibility, yet sufficient rigidity to render it stable in shape, when subjected to load conditions.

Another object is to provide a belt with a tension component above its neutral zone, or pitch line, and a plurality of layers of suitable material below the tension component for reinforcing the surface engaging covering thereof.

Another object is to provide a belt wherein the upper layer of tension cords is overlaid by a transverse reinforcing layer of cord fabric or fiber loaded gum stock.

Further objects, advantages, and salient features will become apparent from the description to follow, the appended claims, and the accompanying drawing, in which:

Figure 1:
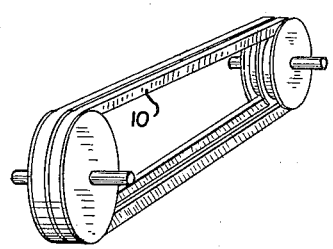
Figure 1 is a side elevation of a pair of V-pulleys over which are trained one or more belts which form the subject of this invention.
Figure 2:
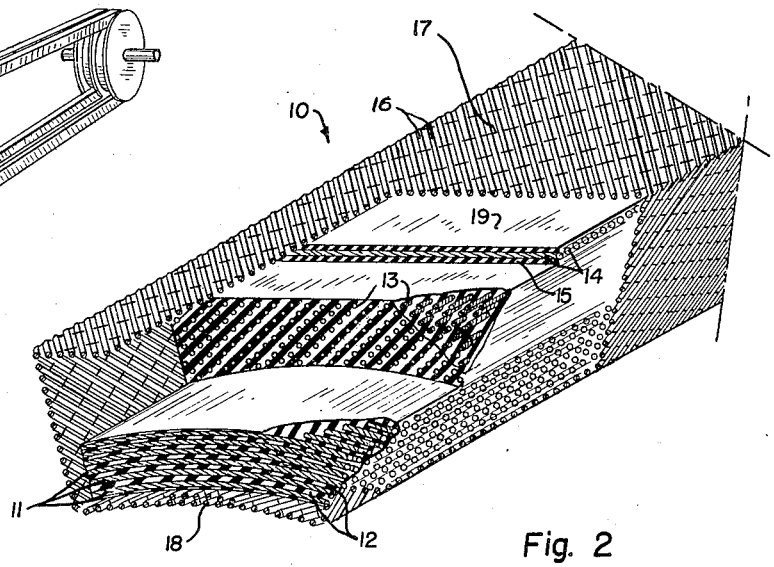
Figure 2 is an enlarged section and fragmentary perspective, portions being broken away, showing the various components of one form of high performance belt used in Figure 1.

Referring in detail to the drawing and with particular reference to Figure 2, which shows one form of the invention, the belt 10 comprises a plurality of layers of cord fabric 11, the cords thereof extending transversely of the belt, these layers being vulcanized together by thin layers of rubber 12. Alternatively, the cord material may be suitably impregnated with uncured rubber and the bonding effected by coating the layers with rubber in liquid form prior to vulcanizing.

After the belt has been built up to the desired height, which, as shown, is near the neutral zone of the belt, and prior to vulcanizing, a cord 13 is next wound around the cross cords to form a plurality of cord layers, the layers being separated by rubber and bonded together by vulcanization when the belt is subsequently cured. This forms the tension core of the belt.

Above the top layer of cords of the tension core a layer of cross-tie cord fabric 14 is provided, this layer being vulcanized to the tension core by rubber layer 15. This layer forms a cross tie which aids in holding the belt together against forces acting laterally of the belt and also aids in maintaining the cords therebelow in a relatively stable position when under stress.

Figure 3:
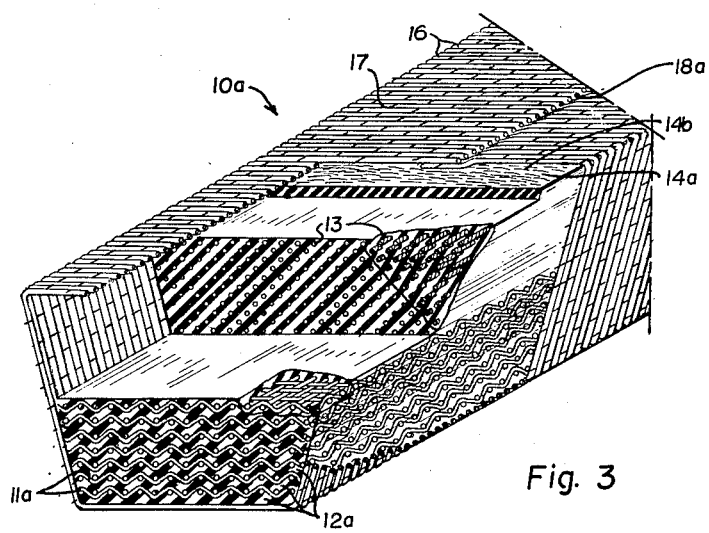
Figure 3 is a similar view of an alternative form of the invention.

The core structure previously described is covered with a cord cover 16 which is wrapped around the core, the cords thereof extending on a bias, or angularly to the longitudinal direction of the belt. This material, like the other cord fabrics described, comprises a plurality of parallel cords secured together by small weft threads 17, at spaced intervals, all bonded together by rubber therebetween. The weft threads are of principal importance only in the manufacture of the cord fabric which may be considered, when on the belt, as a plurality of parallel cords, bonded together by rubber, which are tensionally strong in the direction of the cords and weak in a transverse direction, because of the rubber bond therebetween. This rubber bond between adjacent cords provides the requisite flexibility for the cover as it flexes when passing around the pulleys. As the outer portion of the cover must stretch, the rubber bond between cords easily stretches to provide the elongation necessary. As to the inside cover, the reverse effect takes place, that is, the rubber compresses. There is a neutral zone on the side walls of the belt where no deformation takes place. Above this zone the side wall covers also stretch, and below it, compress. The lap splice 18 of the two ends of the cover may be at the bottom or inner side of the belt, as shown, or at the top, as shown in Figure 3 at 18a, and two bias layers which cross each other may be employed, if desired.

The belt shown in Figure 2, as illustrated, is at least twice as wide as it is in minimum thickness and the inner surface is made concave, these features adding to the flexibility of the belt so that it may readily flex around pulleys of relatively small diameter. The ratio of width to thickness may, of course, be varied as desired and may be less than twice or considerably more, depending upon the particular flexibility required.

In addition to flexibility of the belt the stability of belt shape under load is also highly important. When a V-belt transmits power, the tension in the belt draws it deeper into the pulley grooves. If the belt does not have sufficient stability or reinforcement to absorb the lateral forces which act on the side walls of the belt, these side walls tend to collapse, that is, move toward each other. The effect is to produce localized stress concentration on parts of the side walls resulting in undue wear at such points. In the construction of this invention the side wall coverings of the belt are substantially uniformly supported or reinforced. The cord material at the top supports the side walls in the upper region of the belt and the cord fabric layers similarly support the side walls in the lower region. Thus, any tendency to collapse the walls is uniform across the entire side walls of the belt with the result that wear on such side walls is also uniform.

The cord fabric layers at the lower zone of the belt also serve another important office. The upper tension cords of a belt, under load, tend to move downwardly into the belt at the portions thereof which are in engagement with the pulleys. The effect of this, if they are not supported, distorts the belt out of shape, which as previously described is highly undesirable and one of the principal causes of uneven wear. This invention precludes such results because the lower cord fabric layers offer sufficient rigidity to the belt in an upward direction to prevent the cords in the upper zone from moving any appreciable distance in a direction toward the lower zone.

In Figure 3 is shown an alternative form of belt 10a which has certain of the essential features of the belt of Figure 2, but with slightly modified construction. In place of the cord fabric 11 a plurality of layers of woven fabric 11a is employed, these layers being suitably bonded together by rubber layers 12a. The tension core is the same as in Figure 2 but the cross tie material differs, instead of a cross layer of cords 14, as in Figure 2, a layer of fiber loaded gum stock being applied to the top layer of the tension cords. The cord cover is the same as shown in Figure 2 except that the cords run perpendicular to the longitudinal direction of the belt, although it is to be understood that the cords of the cover layer of either embodiment may extend perpendicular to the longitudinal direction of the belt or on a bias thereto.

The fibers 14b on the fiber loaded gum stock, previously referred to, run transversely of the belt, as shown, this material serving the same purpose as cords 14 in Figure 2, that is to act as a cross-tie which aids in holding the belt together against forces acting laterally of the belt and also in maintaining the cords therebelow in a relatively stable position when under stress.

Having described the invention what is claimed as new is:

1. In a V-belt, a core comprising; a plurality of substantially flat layers of textile material bonded together and disposed adjacent the inner narrow side of the belt, a plurality of layers of tension cords disposed above the first named layers bonded thereto and together, at least one cross-tie layer disposed above the cord layers, the cross tie layer being of a material strong in tension in a direction transversely of the belt and weak in tension in a direction longitudinally of the belt; and a cord fabric cover surrounding the core and bonded thereto, the cords extending in a direction transversely of the longitudinal direction of the belt.

2. A V-belt in accordance with claim 1 wherein the cross tie layer is a cord fabric, the cords thereof extending transversely of the longitudinal direction of the belt.

3. A V-belt in accordance with claim 1 wherein the inner narrow wall of the belt is concave in a direction transversely of the longitudinal direction of the belt.

4. A V-belt in accordance with claim 1 wherein the cross tie layer is a fiber loaded gum stock, the fibers of the gum stock extending transversely of the longitudinal direction of the belt.

THOMAS F. WHITE.

REFERENCES CITED

The following references are of record in the file of this patent:

UNITED STATES PATENTS

| Number | Name | Date |
|---|---|---|
| 1,911,496 | Freedlander | May 30, 1933 |
| 1,970,509 | De Wein et al. | Aug. 14, 1934 |